United States Patent [19]

Adams

[11] 4,272,119
[45] Jun. 9, 1981

[54] VEHICLE COVER ASSEMBLY

[76] Inventor: Robert M. Adams, 41241 Orange Pl., Hemet, Calif. 92343

[21] Appl. No.: 912,070

[22] Filed: Jun. 5, 1978

Related U.S. Application Data

[63] Continuation-in-part of Ser. No. 665,654, Mar. 10, 1976, Pat. No. 4,093,302, which is a continuation-in-part of Ser. No. 654,623, Feb. 2, 1976, abandoned.

[51] Int. Cl.³ .............................................. B60P 3/34
[52] U.S. Cl. .................................................. 296/100
[58] Field of Search ............... 296/100, 102, 156, 159, 296/164, 165

[56] References Cited

U.S. PATENT DOCUMENTS

| | | | |
|---|---|---|---|
| 2,846,262 | 8/1958 | Ray | 296/102 X |
| 2,848,274 | 8/1958 | Geisler et al. | 296/102 |
| 3,066,974 | 12/1962 | Ambli | 296/100 |
| 3,649,063 | 3/1972 | Stark | 296/159 |
| 3,773,379 | 11/1973 | Loiseau | 296/100 X |
| 3,955,732 | 5/1976 | Böschen | 296/100 X |
| 3,964,781 | 6/1976 | Fenton | 296/100 |
| 4,036,521 | 7/1977 | Clemet | 296/100 |

Primary Examiner—John P. Silverstrim
Assistant Examiner—Norman L. Stack
Attorney, Agent, or Firm—Bernard & Brown

[57] ABSTRACT

A camper cover for mounting over the cargo area of a vehicle, such as a pick-up truck. The camper cover includes a plurality of frame members adapted for mounting on the pick-up truck to support a flexible cover over the cargo area of the vehicle. A flexible cover preferably of canvas or plastic carries a fastener for fastening the cover over the frame members and to the vehicle. The fastener includes a hook and loop type separable fastener having a first part carried by the flexible cover and a complementary part carried by the vehicle for releasable interengagement with said first member. The first part of the fastener secured to the canvas is located in a position to maintain the canvas in a taut disposition when in interengagement with the complementary part. Another embodiment includes the use of a flexible cover over the cargo area of the vehicle secured to the vehicle by use of a fastener including a hook and loop type separable fastener without the employment of frame members.

27 Claims, 12 Drawing Figures

VEHICLE COVER ASSEMBLY

This application is a continuation-in-part of copending application Ser. No. 665,654, filed Mar. 10, 1976, now U.S. Pat. No. 4,093,302, which in turn is a continuation-in-part of application Ser. No. 654,623, filed Feb. 2, 1976 and abandoned.

The present invention pertains to a camping vehicle. More particularly the present invention pertains to a camping cover for mounting on a vehicle such as a truck, for example a pick-up truck, to provide camping facilities.

Camping is an activity of increasing popularity. Numerous persons travel extensively with camping vehicles and use such vehicles for lodging during their travels, particularly during vacation periods. Camping trailers have increased in popularity in recent years; however, use of a camping trailer involves towing the trailer behind a car or truck. This slows down travel between campsites and reduces the gasoline mileage of the pulling vehicle. In addition, once a campsite is reached, the camping trailer generally must be assembled, which can be a time-consuming and laborious process particularly in inclement weather or during darkness. When not in use, the camping trailer must be stored, and because of its bulk, a sizable storage location is required.

Self-powered camping vehicles have come into increasing use recently, also. These vehicles are capable of traveling over the highway and then of providing camping facilities with a minimum of set up. The vehicles are very expensive, however, and are not suited to general use but instead are dedicated to a camping function.

There have been developed camping enclosures for attachment to pick-up trucks. Many of these are large, heavy, metallic and wooden structures mounted permanently or semipermanently to the bed of a pick-up truck. While such camping enclosures are readily transported on the pick-up truck and do not require extensive assembly once a campsite is reached, they are also an expensive investment. In addition, during off-season or other times when camping is not being done, they either make use of the pick-up truck for hauling purposes impossible, or they require a large storage space.

There have been proposed camping enclosures for ready attachment to vehicles. U.S. Pat. No. 3,489,453, by way of example, shows a camper unit suited for attachment to a pick-up truck or an automobile and having two compartments, one of which is positioned on each side of the carrying vehicle. U.S. Pat. No. 3,515,426 shows a camping enclosure for mounting on the trunk lid of an automobile. U.S. Pat. No. 3,649,063 shows a camping shelter mounted on a frame which straddles the cargo area of a pick-up truck. Each of these camping units, however, must be collapsed when transported on the vehicle. Thus, they each require extensive assembly when a campsite is reached. In addition because they must be collapsed, articles cannot conveniently be carried inside them during travel. Any articles utilized within the camping structure must be stored elsewhere during movement.

The present invention is a camper cover suited for attachment to a vehicle such as a pick-up truck in a manner permitting driving of the pick-up truck with the camper cover fully assembled thereon. In a second aspect, the present invention is a camping vehicle including such a camper cover mounted on a vehicle such as a pick-up truck. The camper cover of the present invention can be removed and collapsed for ready storage in a small storage space when its use is not desired.

In accordance with the present invention, a plurality of frame members are mounted over the cargo area of a vehicle to form a camper frame, and an inflatable cover member is attached over the camper frame, providing camping facilities within the camper cover and in the cargo area of the vehicle. The vehicle can readily be driven from location to location with the camper cover fully mounted thereon, and yet when camping is not desired for an extended period, but use of the vehicle, for example for general hauling or other purposes, is desired, the camper cover can readily be removed and collapsed for easy storage in a relatively small space. The vehicle, by way of example, might be a pick-up truck. In a preferred form of the present invention, the frame members are tubular members, including tubular bow member secured to the vehicle, e.g. in the stake holes of the pick-up truck, and tubular brace members which interconnect the tubular bow members. The tubular brace members preferably include a first group of brace members which extend between the bow members to urge the bow members apart and a second group of brace members which extend between the bow members to urge the bow members together, thereby imparting considerable rigidity to the camper frame formed by the frame members. In one preferred embodiment, the inflatable cover member is secured in position on the vehicle by means of a pair of slotted extrusions fastened to the sidewalls of the vehicle cargo area and a mating pair of elongated, flexible beads formed along the side edges of the inflatable cover. In a second preferred embodiment, a pair of cooperating tapes is provided for each side edge of the inflatable cover. One tape of each cooperating pair is secured to the sidewalls of the vehicle cargo area, while the other tape of each pair is secured to side edge of the inflatable cover. One tape of each cooperating pair includes a plurality of hook members, and the second tape of each pair includes a plurality of loop members adapted to be engaged by the hook members to provide a separable fastener. The camper cover thus is secured to the vehicle, permitting movement of the vehicle with the camper cover in its assembled condition. The camper cover of the present invention can be used in connection with various vehicles which may be self-powered or even with other vehicles such as trailers. However, the camper cover is particularly suited for use with pick-up trucks.

In another embodiment of the invention as discussed in more detail in the specification, a flexible sheet-like cover member can be used in lieu of the inflatable member which is attached to the camper frame. An example of such flexible members include those made from canvas material and those made from plastic material such as polyvinylchloride. Where such flexible sheet-like material is used it has been found that separable fasteners of the hook and loop type including those sold under the trademark Velcro and Scotchmate can be used to fasten the cover to the vehicle in a manner similar to that discussed above with respect to the inflatable cover. In another embodiment of the invention a flexible sheet-like cover member is secured to the bed of a truck through the use of separable fasteners of the hook and loop type without the need of frame members. One part of the hook and loop type fastener is secured to an upper surface along the periphery of the truck bed while a complementary part is secured to the periphery of the cover for interengagement with the part secured to the truck. These parts of the separable fasteners of the hook and loop type are positioned relative to one another and particularly on the cover to insure that the cover is maintained in a taut disposition. This insures maximum use of the space remaining between the cover and the floor of the truck as well as enhancing the securing ability of the hook and loop type fastener.

These and other aspects and advantages of the present invention are more apparent from the following detailed description and claims, particularly when considered in conjunction with the accompanying drawings in which like parts bear like reference numerals. In the drawings:

Figures 1, 2, 5, 8:
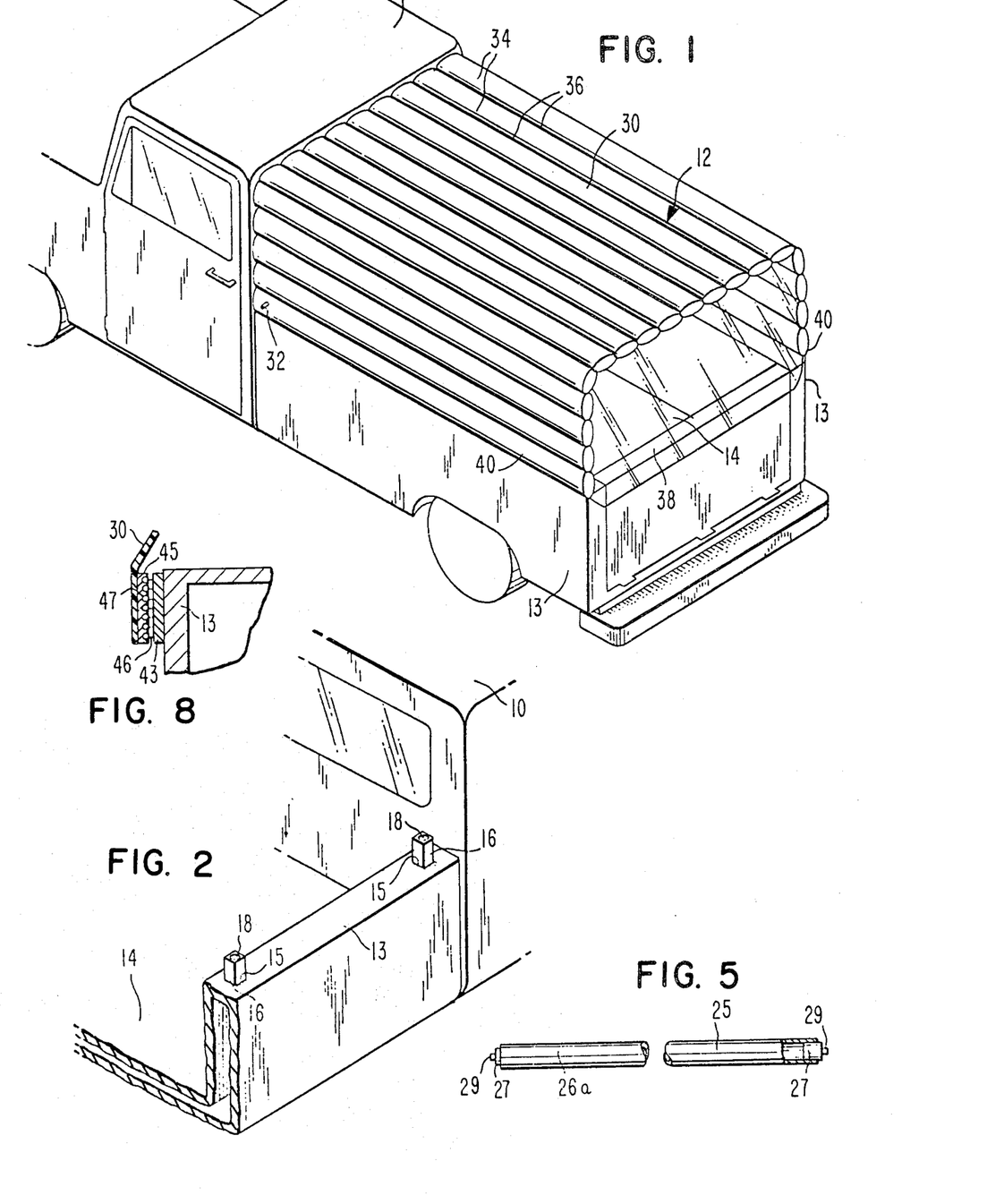
FIG. 1 is perspective view of a camper cover mounted on a suitable vehicle, such as a pick-up truck, in accordance with the present invention.
FIGS. 2 and 3 are fragmentary perspective views showing the mounting of components of the camper cover on a pick-up truck in accordance with the present invention.
FIG. 5 depicts another embodiment of frame members suitable for use in the camper cover of the present invention.
FIG. 8 is an enlarged fragmentary sectional view similar to FIG. 6 but illustrating a second embodiment of the camper cover in accordance with the present invention.

The form of the camper cover 12 of the present invention illustrated in FIG. 1 is adapted for use on a pick-up truck 10 of conventional design. Camper cover 12 fits over cargo area 14 of pick-up truck 10 to provide an enclosed space suitable for sleeping, storage, etc. With camper cover 12 in place, pick-up truck 10 can still be driven, and so disassembly of the camper cover 12 is not required when moving from one camping location to another or when otherwise driving truck 10.

Figures 3, 4:
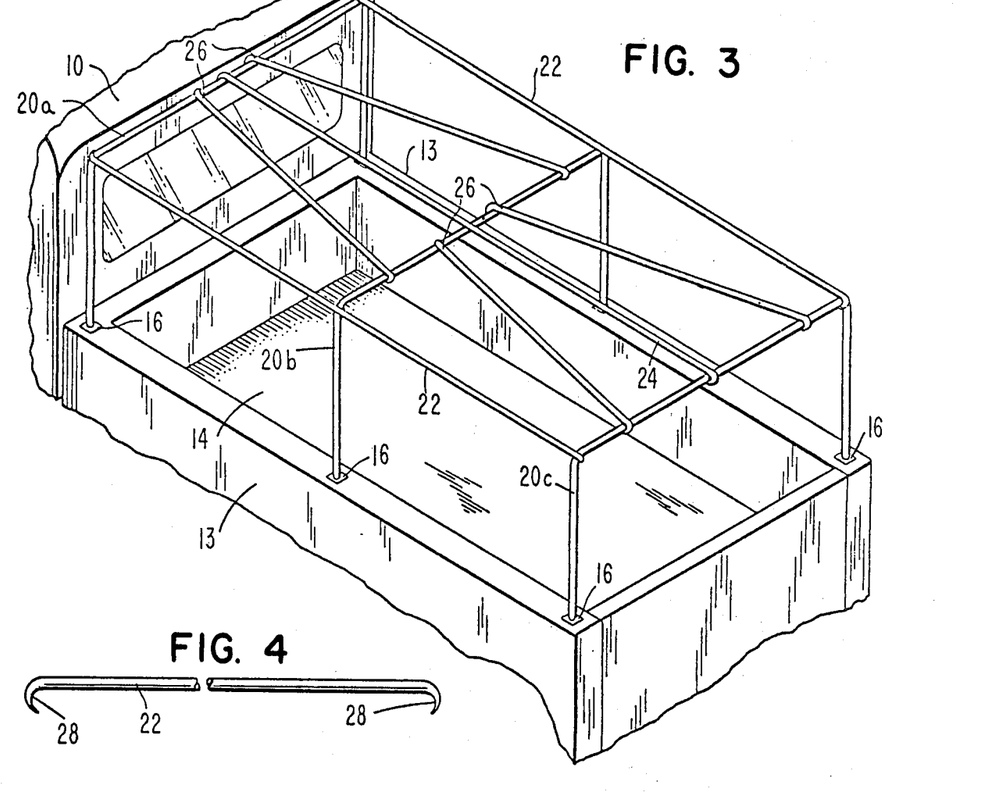
FIG. 4 depicts one embodiment of frame members suitable for use in the camper cover of the present invention.

Pick-up trucks generally are provided with stake holes in the upper horizontal surface of the sidewalls 13 of the cargo area. As depicted in FIG. 2, each such stake hole 15 of pick-up truck 10 has a plug member 16 fitted snuggly therein. Each plug member 16 has an opening 18 in its surface. As depicted in FIG. 3, a plurality of generally U-shaped bow frame members 20 are supported by plug members 16, with the free ends of each bow member 20 inserted within an opening 18 of a plug member 16, each plug member 16, in turn, being within a stake hole 15 of pick-up truck 10. Typically there might be six stake holes 15 arranged in three pairs on the two sidewalls 13 of cargo area 14, and in such case three bow members 20a, 20b, and 20c are utilized, as illustrated in FIG. 3. A longitudinal frame member 22 extends along each side of cargo area 14 from the frontmost bow member 20a, immediately behind the cab of truck 10, to the rearmost bow member 20c, adjacent the rear end of cargo area 14, with the longitudinal frame members 22 positioned adjacent the upper portion of bow members 20. Preferably, another longitudinal frame member 24 extends from bow member 20a to bow member 20c about midway between the two sides of cargo area 14. If desired, to reduce the storage space required when camper cover 12 is not installed on a vehicle, each bow member 20a, 20b, and 20c and each longitudinal frame member 22 and 24 can be formed in two or more sections with ends shaped, for example by swaging, to permit the sections to be fitted together to form the bow member or frame. Two additional frame members 26 extend between the frontmost bow member 20a and the center bow member 20b in a truncated V to provide additional bracing. Likewise, two additional frame members 26 extend from the center bow member 20b to the rearmost bow member 20c in a V brace.

Each of the frame members 20, 22, 24, and 26 is preferably a cylindrical structure and, by way of example, might be formed of a hollow metal tube, for example of aluminum, of a diameter in the order of from about ½" to about ¾". By way of example, if the frame members 20 are formed of ¾" tube, then openings 18 in plug members 16 might be in the order of about 13/16" to receive the ends of frame members 20. The frame members 22, 24, and 26 might be formed of such hollow tube with the ends 28 flattened and rolled as illustrated in FIG. 4 so that each end 28 can snap over a frame member 20. Preferably longitudinal frame members 22 and 24 have such rolled ends 28, while the additional frame members 26 are of the type depicted in FIG. 5, which shows a frame member 26a in the form of a hollow metal tube 25 having a slightly tapered plug 27 of wood or other suitable material securely inserted into each end, with a pin 29 extending outwardly from each plug 27. Bow members 20a, 20b, and 20c are then provided with openings to receive pins 29. Frame members 26a are of a length such that they urge adjacent ones of the bow members 20 together. As a consequence, the camper frame has considerable rigidity, yet can be assembled with no screws, nuts, bolts, etc. and with no requirement for tools.

Alternatively, the frame members 20, 22, 24, and 26 could be formed of other material such as wood, and if desired, frame members 22, 24, and 26 can be held in the desired positions on frame member 20 by bolts and nuts or other suitable means.

Once the frame members 20, 22, 24, and 26 are mounted on the pick-up truck by means by plug members 16 to form the camper frame, inflatable cover member 30 is positioned over the camper frame, as illustrated in FIG. 1. Inflatable cover member 30 is formed of opposed flexible, air tight sheets seamed together, for example by heat sealing, at their edges and further attached together by a plurality of longitudinal seams 36 to form adjacent inflatable ribs 34 within the enclosure. The several inflatable ribs 34 are in gas communication with each other by means of openings across or at the ends of the seams 36. Gas inlet means such as air valve 32 is provided so that gas, e.g. air, can be introduced into and withdrawn from the interior of inflatable cover member 30. When thus inflated, cover member 30 conforms to the shape of the camper frame and has considerable rigidity and is of a configuration analogous to that of an air mattress. Preferably, the inflatable ribs 34 of inflatable cover member 30 are divided into a number of groups of ribs, with the several ribs within each group in gas communication with each other but with the several groups not in gas communication. A gas inlet means is provided for each group. Then should a rib 34 be punctured, only its group of ribs would be deflated while the remainder of inflatable cover member 30 is still inflated. By way of illustration, ribs 34 could be divided into four groups covering the left side, the left top, the right top and the right side of cargo area 14.

Inflatable cover member 30 might be formed of a synthetic, such as polyvinylchloride, for example having a thickness in the order of 0.020 inches. The inflated ribs 34 might have a thickness in the order of two inches. Seams 36 between ribs 34 might be spaced about four-and-one-half inches apart when cover member 30 is deflated. Inflatable cover member is of a size determined by the size of cargo area 14 and typically might measure about twelve feet by eight feet. Preferably a clear rear window panel 38 and a clear front window panel (not shown), which might be inflated, extend from the rear edge and the front edge respectively of inflatable cover member 30, adapted to close the rear and front ends of camper cover 12. Rear window panel 38 can be held in place by snaps or other releasable fasteners for easy access to the interior of camper cover 12. Air valve 32 can be of the type commonly found on automobile or truck tires.

Figure 6:
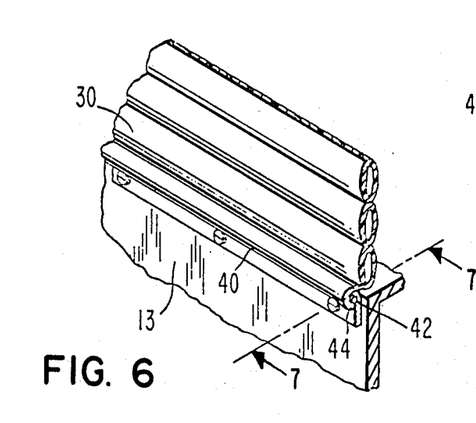
FIG. 6 is a fragmentary perspective view showing a detail of the camper cover in accordance with the present invention.
Figure 7:
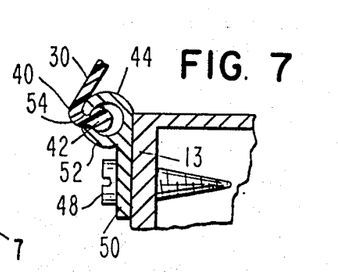
FIG. 7 is an enlarged fragmentary sectional view taken along line 7—7 of FIG. 6.

FIGS. 6 and 7 depict a first means for securing inflatable cover member 30 over the camper frame. As there depicted, each side edge 40 of inflatable cover member 30 is provided with an extruded bead 42 formed of the same flexible material as the inflatable cover. A channel member 44 is fastened to each side edge of cargo area 14 of pick-up truck 10 by means such as screws 48. Channel member 44 includes a flange portion 50, through which screws 48 pass to fasten channel member 44 to sidewall 13, and a channel portion 52 which is an elongated tubular extrusion having a slit 54 therethrough on its outer surface opposite the junction of channel portion 52 and flange portion 50. Bead 42 of inflatable cover member 30 fits within channel portion 52 and inflatable cover member 30 extends through slit 54. A channel member 44 extends the length of cargo area 14 on the sidewall 13 on each side of cargo area 14. Thus, the two sides 40 of inflatable cover member 30 are firmly held onto cargo area 14, fitting snuggly about the camper frame formed by frame members 22, 24, and 26 to hold camper cover 12 securely in place.

FIG. 8 depicts a second embodiment of means for securing inflatable cover member 30 over the camper frame. A pair of cooperating tapes is provided for each side edge 40 of inflatable cover member 30. As depicted in FIG. 8, one tape 43 of each cooperating pair is secured to the sidewall 13 of truck 10, while the other tape 45 of each pair is secured to the side edge 40 of inflatable cover member 30. One tape of each cooperating pair, for example tape 43, has a plurality of hook members 46 extending therefrom, while the second tape of each pair, for example tape 45, has a plurality of loop members 47 on its exposed surface. Hooks 46 engage loops 47 to fasten inflatable cover member 30 over the camper frame formed by frame members 20, 22, 24, and 26 on cargo area 14 of pick-up truck 10.

Cooperating hook and loop fasteners which provide a separable closure member are disclosed in U.S. Pat. Nos. 2,717,437 and 3,009,235 and are marketed as Velcro fasteners. Tape with such hooks extending therefrom and with a pressure sensitive adhesive backing, suitable for use as tape 43 with hook members 46, is available commerically from 3M Company as Scotchmate SJ-3528X Hook-B Pressure Sensitive Tape. Likewise, tape with loops extending therefrom and with a pressure sensitive adhesive backing, suitable for use as tape 45 and loops 47, is available commercially from 3M Company as Scotchmate SJ-3527X Loop Pressure Sensitive Tape. These tapes can readily be applied to sidewall 13 and to inflatable cover member 30.

Camper cover 12 is rapidly assembled on a vehicle such as a pick-up truck 10. First plug members 16 are inserted into the stake holes 15 on the pick-up truck; then U-shaped frame members 20 are inserted into the openings 18 of the plug members 16. Next frame members 22, 24, and 26 are fastened to frame members 20, as depicted in FIG. 3, to form the camper frame. Inflatable cover member 30 is then installed over the camper frame, either by inserting beads 42 into channel members 44 or by placing tape 45 in proper position adjacent tape 43 and applying pressure. Finally, cover member 30 is inflated through air inlet valve 32, thereby completing assembly of the camper cover 12. The camper frame and fastening of side edges 40 of inflatable cover member 30 to sidewalls 13 securely hold camper cover 12 to pick-up truck 10, permitting driving of the pick-up truck with the camper cover installed. Consequently, pick-up truck 10 can be driven from place to place with camper cover 12 in position. Should it be desired to utilize the vehicle without camper cover 12, the camper cover can readily be deflated, removed and stored in a very small space.

Figure 9:
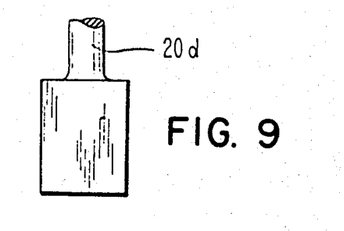
FIG. 9 is a fragmentary view illustrating a modified form of one component suitable for use in the camper cover of the present invention.

If desired rather than using plug members 16, the ends of frame members 20 can be inserted directly into the stake holes of the pick-up truck, thus constituting the mounting means. Either the frame members can be of the cross-section required by the stake holes, or each frame member can have its end portion shaped to fit the stake holes, as illustrated on frame member 20d of FIG. 9.

An alternate embodiment includes a flexible sheet material which can be made of canvas or plastic in lieu of the inflatable cover member 30 described above with respect to FIG. 1. Such a flexible sheet material would have substantially the same length and width dimensions for fitting over the frame members as does the inflatable cover 30. However, because a sheet-like material is used, substantial savings can be achieved by avoiding in the manufacturing process the production of cavities which must be inflated through the use of valves and related apparatus. Thus, where even more economy is required, the canvas or plastic sheet material provides a satisfactory covering and can be adapted readily to fit over the frame members which are secured to the pick-up truck as described above.

Although a multitude of securing means are available for use with a flexible sheet material such as the canvas or plastic discussed above, it has been found that a separable fastener member of the hook and loop type is uniquely adaptable to this kind of attaching process. This is because of the configuration of the frame members in conjunction with the flexible cover along with the attachment characteristics of a hook and loop type fastener. The configuration is one which imparts forces primarily in a plane parallel to the plane of attachment of a hook and loop fastener when the cover is in a taut disposition. Hook and loop fasteners can readily adhere to one another and easily pulled apart in a direction perpendicular to the plane of engagement. However, parallel to the plane of engagement in the shear direction, the hook and loop fasteners require significantly greater magnitude of forces to break the engagement between two parts of a joined fastener. Separable fasteners of the hook and loop type which can be used for this purpose include the fasteners discussed above sold under the trademark of Velcro and Scotchmate.

When using a flexible sheet-like cover, such as canvas or plastic material, one part of the separable fastener will be secured adjacent each edge 40 of cover member 30 for engagement with a complementary part 43 secured to the vehicle 13 as can be seen in FIG. 8. However, the first part is located relative to the dimensions of the cover to insure that the cover is maintained in a taut disposition over the frame when the first part is pressed into engagement with the complementary part on the vehicle. This accomplishes at least two advantages in using such a system for providing a cover to a truck. The first of the advantages is that a relatively smooth surface is presented to the surrounding atmosphere. Secondly, it insures that the engagement between the first and second parts of the separable fastener of the hook and loop type remain in engagement and will not be inadvertently disengaged which might be the case if the cover were not maintained in a taut disposition. In this regard the frame is configured relative to the vehicle, such that the side portions of the cover extend in a plane substantially parallel to the plane of engagement for the hook and loop type fastener.

In assembling the flexible sheet-like material, it is stretched over the frame elements until the first part of the separable fastener is in a position substantially opposite its complementary part of the vehicle. In this position the first part is simply pressed into the second part such that the hooks and loops are in interengagement with one another to releasably secure the cover to the vehicle. To disengage the cover, the first part is simply peeled away from the complementary part with the fingers or instrument which has the effect of pulling the hooks and loops in a direction substantially perpendicular to the shear direction or plane of engagement. Thus with this configuration the sheet-like material can be easily assembled and disassembled while simultaneously enhancing the configuration of the sheet-like material to the supporting frames and the securing ability of the fastening means.

The tonneau cover and its attachment means which will be described hereinafter eliminates many of the problems that have been associated with attaching tonneau covers heretofore. Now in referring to FIGS. 10, 11, and 12, it can be seen that a separable fastener member of the hook and loop type is used in conjunction with the cover 60 to fasten the cover 60 to the bed of the pick-up truck. The cover includes an underside 64 which has rectangular dimensions substantially equal to or slightly greater than those defined by the outer sidewalls 13 of the pick-up truck 10. The hook and loop fastener 68 includes a loop part 70 having upstanding loops 71 which is secured about the periphery of the cover 60 on its underside 64. A complementary hook part 72 is secured on the upper surface 62 of the sidewalls for interengagement with the upstanding loop pile of the loop part 70. In this preferred embodiment both the hook part 72 and the loop part 70 extend continuously about the entire perimeter on which they are secured. However, smaller strips could be placed at various intervals so long as they are sufficient to achieve interengagement for maintaining the cover in a taut disposition.

Figure 10:
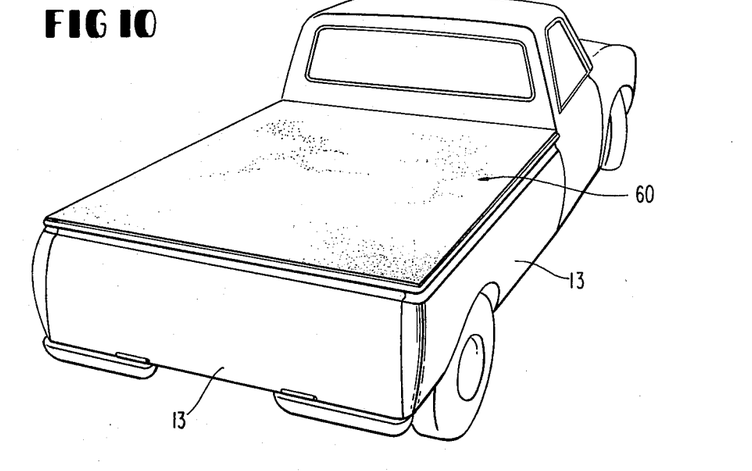
FIG. 10 is a perspective view showing the tonneau cover attached to the bed of a truck.
Figure 11:
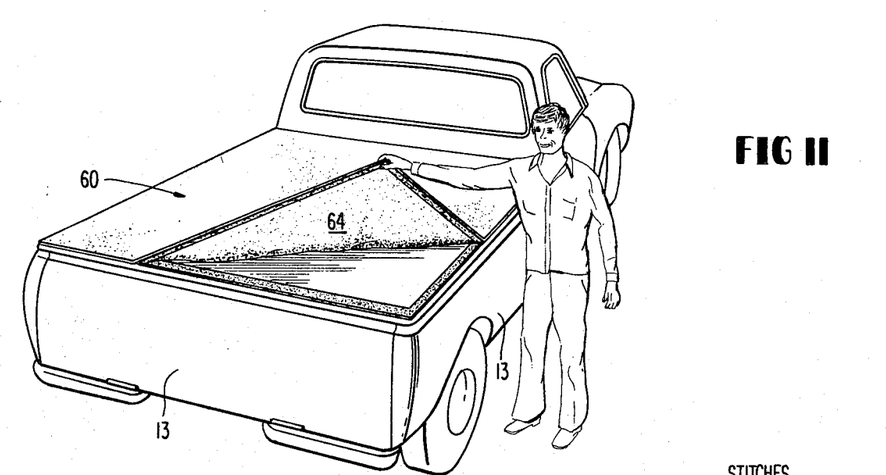
FIG. 11 is a tonneau cover of FIG. 10 peeled back slightly.
Figure 12:
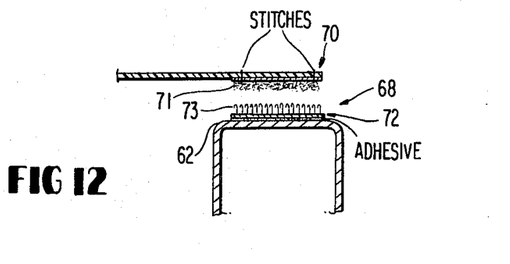
FIG. 12 is a partial view of the hook and loop fastener member enlarged to show the interengaging members used in attaching the tonneau to the truck.

As explained in conjunction with the use of a flexible cover and a separable fastener member of the hook and loop type used on the frame members above, the loop part 70 is secured to a portion of the cover 60 such that when it is in engagement with this complementary hook 72 part the cover 60 will be maintained in a taut disposition. As discussed above, the characteristics of these type of hook and loop fasteners are such that they resist significant forces in the shear direction while allow disengagement of the members in a perpendicular or peeling relationship.

To insure that the truck is not damaged during the application of the separable fastener the hook and loop type, the hook part 72 is secured to the truck by an adhesive. More specifically the hook pile tape sold under the trademark Scotchmate is employed which uses a pressure sensitive adhesive where all that is required is to lay the pressure sensitive surface against the upper surface 62 of the sidewalls 13 and press substantially to secure the tape thereto. On the other hand the loop part 70 in this embodiment is sewn to the peripheral portions of the cover 60. However, these could also be secured by adhesive or other convenient means. After each portion of the separable fastener 68 has been secured, the hook part 72 is simply pressed into interengagement with the loop part 70 on the truck to secure the tonneau cover 60 in place in a taut disposition as shown in FIG. 10. To disengage the tonneau cover it can simply be peeled away as shown in FIG. 11. In this way means are provided for attaching a tonneau cover 60 to a truck without necessarily damaging or depreciating the value of the truck as a result of the type of attaching means used.

In the preferred embodiment above using the flexible sheet-like member as a tonneau cover, the tailgate 74 was also used as a surface on which one part of the separable fastener 68 could be placed. However, it may be desirable to leave that part of the separable fastener off of the tailgate 74 allowing ready access to the bed portion while the tonneau cover 60 is maintained to the remaining portions of the sidewalls.

Although the present invention has been described with reference to a preferred embodiment, numerous rearrangements and modifications could be made, and still the result would be within the scope of the invention.

What is claimed is:

1. A camper cover adapted for attachment to a vehicle for a cargo area, said camper cover comprising:
   (a) a plurality of frame members adapted for mounting on a vehicle to form a camper frame of the cargo area of the vehicle;
   (b) a cover member formed of a flexible sheet material having a front edge, a rear edge, and two side edges adapted to fit over the camper frame formed by said frame members to form a camper cover;
   (c) means for securing at least said two side edges of said cover member to the sidewalls of the cargo area of the vehicle; and
   (d) said means for securing said two side edges including a separable fastener of the hook and loop type having a first part with a plurality of upstanding hook or loop type members extending therefrom and a complementary part having a plurality of complementary upstanding hook or loop type members for interengagement with the upstanding members of said first part, along a plane of interengagement, said first part being disengaged from said complementary part when peeled away to effect pulling of hook and loop type members substantially perpendicularly to the plane of interengagement and said first part resisting disengagement when subjected to forces parallel to the plane of interengagement, said first part being secured to said cover member adjacent said two side edges and said complementary part being secured to said sidewalls of the cargo area for releasable engagement with said first part and said first part of said separable fastener being located relative to the side edges of said cover member for maintaining said cover member in a taut disposition over said frame members whereby said first member is releasably secured to said complementary part by pressing said first part into engagement with said complementary part to effect interengagement of said upstanding members and prevent inadvertent disengagement of said first part and said complementary part.

2. The camper cover according to claim 1 wherein said first part of said separable fastener is sewn to said cover and said complementary part is secured to said vehicle by an adhesive.

3. Camper cover according to claim 1 wherein said first part of said separable fastener is secured to said cover by an adhesive and said complementary part of said fastener is secured to said vehicle by an adhesive.

4. The camper cover according to claim 1 wherein said upstanding members of said first part of said separable fastener are substantially all of the type and said upstanding members of said complementary part of said fastener are substantially all of the hook type.

5. The camper cover according to claim 1 wherein said first part of said fastener extends substantially along the entire length of said two edges and said complementary part of said fastener extending substantially along a length of said sidewalls of said cargo area equal to the length of said first part secured to said cover member.

6. The camper cover according to claim 1 wherein said flexible sheet material includes a canvas material.

7. The camper cover according to claim 1 wherein said flexible sheet material includes a flexible plastic.

8. The camper according to claim 1 further comprising a rear window panel extending from a said rear edge of said cover member, a second separable fastener member for securing rear window panel to said vehicle, said fastener member including another first part secured along the bottom edge of said rear window panel, said vehicle defining a rear portion having an upper edge, said second fastener including another complementary member secured along adjacent the upper edge of said rear portion for engagement with said another first part.

9. A camper adapted for attachment to a vehicle having a cargo area, said camper cover comprising:
a plurality of longitudinally spaced apart, transverse frame members having an upper portion and a depending side portion and adapted for mounting on a vehicle to form a camper frame over the cargo area of a vehicle;
a cover member formed of a flexible sheet material having a front edge, a rear edge, a two side edges adapted to fit over the camper frame formed by said frame members to form a camper cover;
a plurality of longitudinal bracing members extending between adjacent frame members to form a brac;
said cargo area having upwardly extending sidewalls;
means for securing at least two side edges of said cover member to the sidewalls of the cargo area; and
said means for securing said two side edges including a separable fastener of the hook and loop type having a first part with a plurality of hook or loop type upstanding members extending therefrom and a complementary part having a plurality of complementary upstanding hook or loop type members extending therefrom for interengagement of the upstanding members of said first part along a plane of interengagement, said first part being disengageable from said complementary part when pulled away to effect pulling of hook and loop type members substantially perpendicularly to the plane of interengagement, and said first part resisting disengagement when subjected to forces parallel to the plane of interengagement; said first part being secured to said cover member adjacent to said side edges and said complementary part being secured to said sidewalls of said cargo area for releasable engagement with said first part whereby said cover can be releasably secured to said vehicle by pressing the upstanding members of said first part into the complementary upstanding members of said complementary part.

10. A camper cover according to claim 9 wherein said frame members are cylindrical frame members.

11. A camper cover according to claim 10 wherein said frame members are tubular frame members.

12. A camper cover according to claim 9 wherein a first group of said bracing members are adapted to extend between said frame members to urge said frame members apart, and a second group of bracing members are adapted to extend between the end said frame members to urge said end frame members together, thereby imparting rigidity to the camper frame formed by said frame members.

13. A camper cover as claimed in claim 9 further comprising mounting means for mounting said frame members on the vehicle.

14. A camper cover as claimed in claim 13 in which:
said mounting means are a plurality of plugs adapted for insertion into stake holes in the sidewalls of the cargo area for the vehicle, with each of said plurality of plugs having an opening therein; and
the depending side portions of said frame members being adapted for insertion in the openings of said plugs.

15. A camper cover as claimed in claim 9 in which said flexible cover member includes a front panel extending from said flexible cover member front edge to close the front end of said camper cover when over the cargo area of the vehicle.

16. A camper cover as claimed in claim 15 in which said flexible cover member includes a rear panel extending from said flexible cover member rear edge to close the rear end of said camper cover when over the cargo area of the vehicle.

17. A camper cover as claimed in claim 9 in which said flexible cover member includes a rear panel extending from said flexible cover member rear edge to close the rear end of said camper cover when over the cargo area of the vehicle.

18. A camper cover as claimed in claim 9 in which said flexible cover member is formed of polyvinylchloride.

19. A cover assembly adapted for attachment to a vehicle having a cargo area, said cover assembly comprising:
 a plurality of transverse frame members adapted for mounting on a vehicle to form a frame over the cargo area of the vehicle, said frame members comprising first and second end and intermediate frame members, said frame members having an upper portion and depending side portions;
 first longitudinal bracing means extending between said end frame members, second bracing means comprising a first pair of support members extending between said first and frame member and an intermediate frame member, the ends of said first pair of support members being closer together at said first and frame member than at their intermediate frame members;
 third longitudinal bracing means comprising a second pair of support members extending between said second frame member and an intermediate frame member, the ends of said second pair of support members being closer together at their intermediate frame members than at said second end member;
 said second bracing means includes said first pair of support members having a length which effects urging of said first end frame member and its intermediate frame member apart, and said third bracing means includes said second pair of said support members having a length which effects urging of said second end frame member and its intermediate frame member apart;
 a flexible cover member having an upper portion and depending side portions; and
 separable fastener means for securing said cover member over said frame members to said vehicle.

20. The cover assembly of claim 19 in which said second and third bracing means extend from their respective end frame members to the same intermediate frame member.

21. The cover assembly of claim 20 in which said first bracing means urges said end frame members together.

22. The cover assembly of claim 21 in which said bracing means are attached to said frame members by snap-type connections.

23. A vehicle cargo area comprising upstanding sidewalls forming a cargo area;
 a unitary cover member formed of flexible sheet material having a front edge, a rear edge, and two side edges adapted to fit over respective sidewalls of said cargo area;
 means for securing the respective side edges of said cover member to said respective sidewalls of the cargo area of the vehicle to hold said side edges to said sidewalls with the cover being tautly held therebetween; and
 each of said means for securing said side edges including a separable fastener of the hook and loop type having a first part with a plurality of upstanding hook or loop type members extending therefrom and a complementary part having a plurality of complementary upstanding hook or loop type members extending therefrom for interengagement with the upstanding members of said first part along a plane of interengagement, said first part being disengageable from said complementary part when peeled away to effect pulling of hook and loop type members substantially perpendicularly to the plane of interengagement and said first part resisting disengagement when subjected to forces parallel to the plane of interengagement, said first part being secured to said cover member adjacent to a said side edge and said complementary part being secured to a said sidewall of the cargo area for releasable engagement with said first part and said first part of said separable fastener being located relative to the side edge of said cover member for maintaining said cover member in a taut disposition over said cargo area whereby said first member is releasably secured to said complementary part by pressing said first part into engagement with said complementary part to effect interengagement of upstanding members and prevent inadvertent disengagement of said first part and said complementary part.

24. A vehicle cargo area comprising upstanding sidewalls, a front wall and a rear wall forming a cargo area;
 a unitary cover member formed of flexible sheet material having a front edge, a rear edge and two side edges adapted to fit over respective walls of said cargo area;
 means for securing the respective front edge, rear edge and side edges of said cover member to their respective walls of the cargo area of the vehicle to hold said side edges to said sidewalls with the cover being held tautly therebetween; and
 each of said means for securing said edges including a separable fastener of the hook and loop type having a first part with a plurality of upstanding hook or loop type members extending therefrom and a complementary part having a plurality of complementary upstanding hook or loop type members extending therefrom for interengagement with the upstanding members of said first part along a plane of interengagement, said first part being disengageable from said complementary part when peeled away to effect pulling of hook and loop type members substantially perpendicularly to the plane of interengagement and said first part resisting disengagement when subjected to forces parallel to the plane of interengagement, said first part being secured to said cover member adjacent to a said edge and said complementary part being secured to a said wall of the cargo area for releasable engagement with said first part and said first part of said separable fastener being located relative to the edge of said cover member for maintaining said cover member in a taut disposition over said cargo area whereby said first member is releasably secured to said complementary part by pressing said first part into engagement with said complementary part to effect interengagement of upstanding members and prevent inadvertent disengagement of said first part and said complementary part.

25. The cover according to claim 23 or 24 wherein each of said walls defines an upper surface substantially coplaner, and said first part of said separable fastener being secured to said upper surface.

26. The cover according to claim 25 wherein said first part of said separable fastener is sewn to said cover member and said second part of said separable fastener is secured to said walls of the cargo area by a pressure sensitive adhesive.

27. The cover according to claim 26 wherein said first part is a loop part of a hook and loop separable fastener and said second part is a hook part of a hook and loop separable fastener.

* * * * *

REEXAMINATION CERTIFICATE (330th)
United States Patent [19]
Adams

[11] B1 4,272,119
[45] Certificate Issued Apr. 2, 1985

[54] VEHICLE COVER ASSEMBLY

[76] Inventor: Robert M. Adams, 41241 Orange Pl., Hemet, Calif. 92343

Reexamination Request:
No. 90/000,559, May 18, 1984

Reexamination Certificate for:
Patent No.: 4,272,119
Issued: Jun. 9, 1981
Appl. No.: 912,070
Filed: Jun. 5, 1978

Related U.S. Application Data

[63] Continuation-in-part of Ser. No. 665,654, Mar. 10, 1976, Pat. No. 4,093,302, which is a continuation-in-part of Ser. No. 654,623, Feb. 2, 1976, abandoned.

[51] Int. Cl.³ .............................................. B60P 3/34
[52] U.S. Cl. .................................................. 296/100
[58] Field of Search ............... 296/100, 102, 98, 159, 296/156, 164, 165; 160/354, 368 R, 371; 150/52 R

[56] References Cited

U.S. PATENT DOCUMENTS

| | | | |
|---|---|---|---|
| 2,846,262 | 8/1958 | Ray | 296/102 |
| 2,848,274 | 8/1958 | Geisler et al. | 296/102 |
| 3,066,974 | 12/1962 | Ambli | 296/100 |
| 3,534,750 | 10/1970 | Kolozsvary | 135/1 |
| 3,649,063 | 3/1972 | Stark | 296/159 |
| 3,773,379 | 11/1973 | Loiseau | 296/100 |
| 3,955,732 | 5/1976 | Böschen | 296/100 |
| 3,964,781 | 6/1976 | Fenton | 296/100 |
| 4,036,521 | 7/1977 | Clanet | 296/100 |
| 4,179,152 | 12/1979 | Kent | 296/196 |

*Primary Examiner*—Robert R. Song

[57] ABSTRACT

A camper cover for mounting over the cargo area of a vehicle, such as a pick-up truck. The camper cover includes a plurality of frame members adapted for mounting on the pick-up truck to support a flexible cover over the cargo area of the vehicle. A flexible cover preferably of canvas or plastic carries a fastener for fastening the cover over the frame members and to the vehicle. The fastener includes a hook and loop type separable fastener having a first part carried by the flexible cover and a complementary part carried by the vehicle for releasable interengagement with said first member. The first part of the fastener secured to the canvas is located in a position to maintain the canvas in a taut disposition when in interengagement with the complementary part. Another embodiment includes the use of a flexible cover over the cargo area of the vehicle secured to the vehicle by use of a fastener including a hook and loop type separable fastener without the employment of frame members.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-27 is confirmed.

* * * * *